(12) United States Patent
Kashi et al.

(10) Patent No.: US 6,598,798 B1
(45) Date of Patent: Jul. 29, 2003

(54) CODE READER AND CODE READING METHOD FOR COLOR IMAGE

(75) Inventors: Motofumi Kashi, Tokyo (JP); Shinji Fujita, Tokyo (JP)

(73) Assignee: Tohken Co., Ltd., Tokyo (JP)

( * ) Notice: Subject to any disclaimer, the term of this patent is extended or adjusted under 35 U.S.C. 154(b) by 84 days.

(21) Appl. No.: 09/669,413

(22) Filed: Sep. 25, 2000

(51) Int. Cl.[7] ................................................ G06K 9/22
(52) U.S. Cl. ......................... 235/462.25; 235/462.01; 235/462.04; 235/462.1; 235/472.01
(58) Field of Search ....................... 235/462.01, 462.09, 235/462.04, 462.06, 454

(56) References Cited

U.S. PATENT DOCUMENTS

| | | | | |
|---|---|---|---|---|
| 5,576,528 A | * | 11/1996 | Chew et al. | 235/469 |
| 5,714,745 A | * | 2/1998 | Ju et al. | 235/469 |
| 5,808,286 A | * | 9/1998 | Nukui et al. | 235/472 |
| 5,917,171 A | * | 6/1999 | Sasai | 235/462.01 |
| 5,959,285 A | * | 9/1999 | Schuessler | 235/462.04 |
| 5,992,748 A | * | 11/1999 | Takahashi et al. | 235/465 |
| 6,006,990 A | * | 12/1999 | Ye et al. | 235/454 |
| 6,062,475 A | * | 5/2000 | Feng | 235/462.06 |
| 6,375,075 B1 | * | 4/2002 | Ackley et al. | 235/462.04 |

FOREIGN PATENT DOCUMENTS

JP     10-307886     11/1998

* cited by examiner

Primary Examiner—Michael G. Lee
Assistant Examiner—Ahshik Kim
(74) Attorney, Agent, or Firm—TraskBritt

(57) ABSTRACT

A code reader for color images, which can simultaneously accept a one-dimensional code or a two-dimensional code and data of a color image of a subject for management and which can record both the data in mapping with each other, is provided.

The code reader comprises color image pickup means for picking up a code and also a color image of a subject for management as is specified by identification information contained in the code; code-recognizing-data extraction means for extracting luminance data from the color image data picked up by the color image pickup means, and for writing gray scale data into a first frame memory as data for recognizing the code; and recorded-image extraction means for extracting color data from the color image data picked up by the color image pickup means, and for writing the color data into a second frame memory as data for the original image of the subject for management.

4 Claims, 4 Drawing Sheets

1

```
  G  39180              CHEQUE                    TOKYO  1301
                                                  0008-628

BANK        BRANCH

AMOUNT OF MONEY                        No.

PLEASE PAY THE ABOVE AMOUNT TO THE BEARER
      IN EXCHANGE FOR THIS CHEQUE.
      PROTEST UNNECESSARY
      DATE:
      PLACE OF ISSUE
      MINATO-KU, TOKYO    ISSUER

ACCOUNT NUMBER   CHEQUE NUMBER
  ⑈0⑈⑆  ⑆1301⑇0008⑆  628⑈   124216⑈  39180
```

2

CODE READER AND CODE READING METHOD FOR COLOR IMAGE

BACKGROUND OF THE INVENTION

1. Field of the Invention

The present invention relates to a code reading apparatus and code reading method which read a one-dimensional or two-dimensional code in non-touching fashion. More particularly, it relates to a code reading apparatus and code reading method for color images, in which information expressed by the above code is recognized from a color image, and in which the recognized data of the pertinent code and the original color image data of a subject for management as specified by this code can be recorded in a mapping with each other.

2. Description of the Related Art

In cases of copying and managing various kinds of printed matter, such as deeds, newspapers, books and documents (hereinbelow, termed "information sources" or "subjects for management"), there has been adopted a method wherein the subjects for management are managed using microfilm, or a method wherein image data accepted by a scanner or the like are recorded on a recording medium and are managed by employing a computer. When the subjects for management as mentioned above are put into the shape of a database so as to be retrievable by way of example and are managed by utilizing a computer, codes for specifying the individual subjects for management are required. Although the codes depend also upon the sorts of the subjects for management and the purposes of the management, a code formed of the character strings of classification No., bond No., document No., a date, etc. is usually afforded in order to specify each of the subjects for management, and the pertinent subject for management is recorded on a recording medium and is managed in association with the identifying code. In this manner, the various information sources are managed by utilizing the computer, whereby the retrievals of the information sources are facilitated. Moreover, it is dispensed with to take copies of the information sources on paper or the like and to keep the copies in custody, and a space for custody can be made smaller.

Meanwhile, in recent years, one-dimensional or two-dimensional codes in each of which the No., trade name, price and other information items of a product or a component are symbolized by a bar pattern in, for example, monochrome have been extensively employed in order to recognize the Nos., trade names, prices and other information items of products or components. Such one-dimensional codes or two-dimensional codes expressed by the code patterns having different reflection factors represent a series of numerals and characters in terms of the combinations of the ratios between the widths of lines in, for example, white and black, and the Nos., trade names, prices and other information items of the products or components are replaced with the numerals and characters.

Therefore, in a case where the one-dimensional codes or two-dimensional codes are utilized as the above identifying codes for specifying the subjects for management and where management information items are further included in the codes, the labor of inputting codes anew can be saved, and it is permitted to easily manage the images of the various subjects for management. A code reading apparatus for such one-dimensional codes or two-dimensional codes recognizes each code from a white-and-black image (achromatic image), and it includes an imaging device for the white-and-black images as has a high resolution. In general, it is incarnated as an apparatus dedicated to the code reading.

Meanwhile, an example of an optical information reading apparatus furnished with the function of reading images other than codes is disclosed in the official gazette of Japanese Patent Laid-Open No. 307886/1998. The apparatus disclosed in this official gazette (hereinbelow, termed the "prior-art example") is such that an image to be read and a two-dimensional code can be simultaneously accepted by a single portable terminal. More specifically, the read port of a handy scanner is directed toward the sealing area 72 of a delivery slip 70 as shown in FIG. 1 by way of example, so as to read the two-dimensional image thereof, and two-dimensional image data (multi-valued image data obtained by quantizing continuous density values) are stored in a multi-valued image memory as they are, while binary image data obtained by binary-coding the multi-valued image data are stored in a two-valued image memory, whereupon the contents of both the memories are transmitted to a host computer or the like. Besides, a two-dimensional code 74 existing in the sealing area 72 is decrypted on the basis of the above binary image data, and the decrypted code data and the two-dimensional image data of the sealing area 72 can be recorded in association.

The apparatus disclosed in the prior-art example stated above decrypts the code on the basis of the binary image data composed of the two levels of "1" (high) and "0" (low), and it is effective in the case of managing the achromatic information sources of the sealing information, etc. However, it is not applicable in a case where the information sources are colored, and it has such a disadvantage that the range of utilization is limited. In order to cope with color images, it is considered by way of example that a system in which the signal of any of color components R, G and B is binary-coded into data for decrypting the code is applied to the apparatus disclosed in the prior-art example. However, even when an imaging device of high resolution is employed, the sensitivity thereof lowers to 1/3, to pose the problem that code recognition of high precision cannot be realized. Also considered is a method in which a code reading apparatus such as bar code reader, and an image processing apparatus are unitarily constructed, but the method poses the problems that the whole apparatus becomes large in size and that it becomes expensive.

SUMMARY OF THE INVENTION

The present invention has been made in view of the above circumstances, and it has for its object to provide a code reading apparatus capable of coping with color images, which can simultaneously accept a one-dimensional code or two-dimensional code and the data of the color image of a subject for management, and which can record both the data in mapping with each other. Another object is to provide a code reading apparatus and method for color images, which has a high precision for recognizing a code, which is inexpensive and which is small in size.

The present invention concerns a code reading apparatus and method which read a one-dimensional or two-dimensional code in non-touching fashion. Regarding the apparatus, the objects of the present invention are accomplished by comprising color image pickup means for picking up the code and also a color image of a subject for management as is specified by identification information contained in said code; code-recognizing-data extraction means for extracting luminance data from the color image data picked up by said color image pickup means, and for writing gray scale data into a first frame memory as data for recognizing said code; and recorded-image extraction means for extracting color data from said color image data picked up by said color image pickup means, and for writing the color data into a second frame memory as data for the original image of the subject for management.

Further, the objects are accomplished more effectively by each of a contrivance in which said code-recognizing-data extraction means extracts the luminance data in such a way that pixel data of respective color components R, G and B constituting said color image data are added at predetermined ratios; a contrivance in which a signal processing circuit of said code-recognizing-data extraction means and a signal processing circuit of said recorded-image extraction means are connected to an output side of said color image pickup means through an A/D converter and in parallel with each other, and said color image data is concurrently processed by the signal processing circuits so as to separate and extract the luminance data and said color data; and a contrivance in which decode means for recognizing and decoding the information expressed by said code, from the gray scale data is comprised.

Besides, regarding the method, the objects of the present invention are accomplished in such a way that a color imaging device is employed as an imaging element of a code reading apparatus; that a one-dimensional or two-dimensional code which contains identification information for specifying a subject for management, and color image data which contains the subject for management, are inputted from the imaging device; that pixel data constituting the color image data is concurrently processed by respective signal processing circuits for luminance extraction and for color extraction, thereby to separate and extract luminance data and color data; that the information expressed by the code is recognized on the basis of gray scale data formed of the luminance data of each pixel; and that said code and the original color image data of said subject for management can be recorded in mapping with each other.

DESCRIPTION OF THE PREFERRED EMBODIMENTS

According to the present invention, in a code reading apparatus which reads a code of one dimension or two dimensions in non-touching fashion, a two-dimensional color imaging device (or one-dimensional color imaging device) is employed as an imaging element, a subject for management and the code for specifying the subject for management are imaged so as to be confined within an identical imaging area, and luminance data for recognizing the code and data for recording an original image are separated and extracted from the RGB data of each of pixel positions constituting the color image data. Besides, gray scale data (achromatic scale data) for the code recognition, which corresponds to one pixel and which is constituted by the luminance data, and the color image data for the original image recording, which is composed of the color data and the luminance data, are respectively written into frame memories. Thus, the code recognition is permitted to proceed at a high precision, and the original image of the subject for management can be easily recorded and managed in mapping with the code.

By way of example, the colored paper etc. which include such securities as bills, cheques, stock certificates and bonds, which have heretofore been managed with microfilm etc., are appropriately applied as the subjects for management whose images are to be read. Apart from the paper etc., colored three-dimensional objects may well be set as the subjects for management.

The system architecture of the code reading apparatus is such that the color image data from the color image read means is branched and outputted, that the branched and outputted color image data are concurrently processed by respective circuits for luminance extraction and for color extraction, and that the gray scale data is written into a first frame memory, while the original image data is written into a second frame memory. Thus, it is possible to provide the code reading apparatus which has a comparatively inexpensive construction, which is small in size and which is capable of coping with the color images.

Now, the preferred embodiments of the present invention will be described in detail with reference to the drawings.

Figure 1:
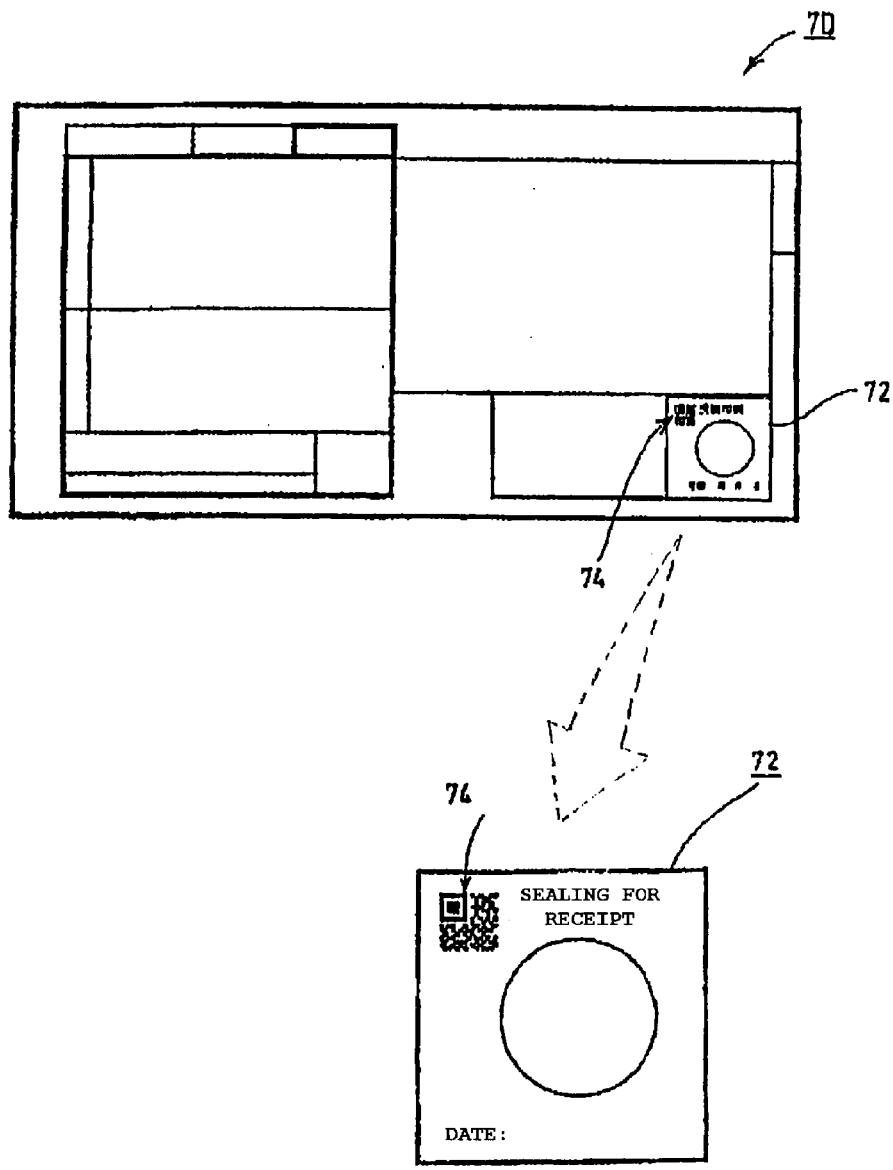
FIG. 1 is a diagram for explaining an example of a prior-art optical information reading apparatus furnished with the function of reading images.
Figure 2:
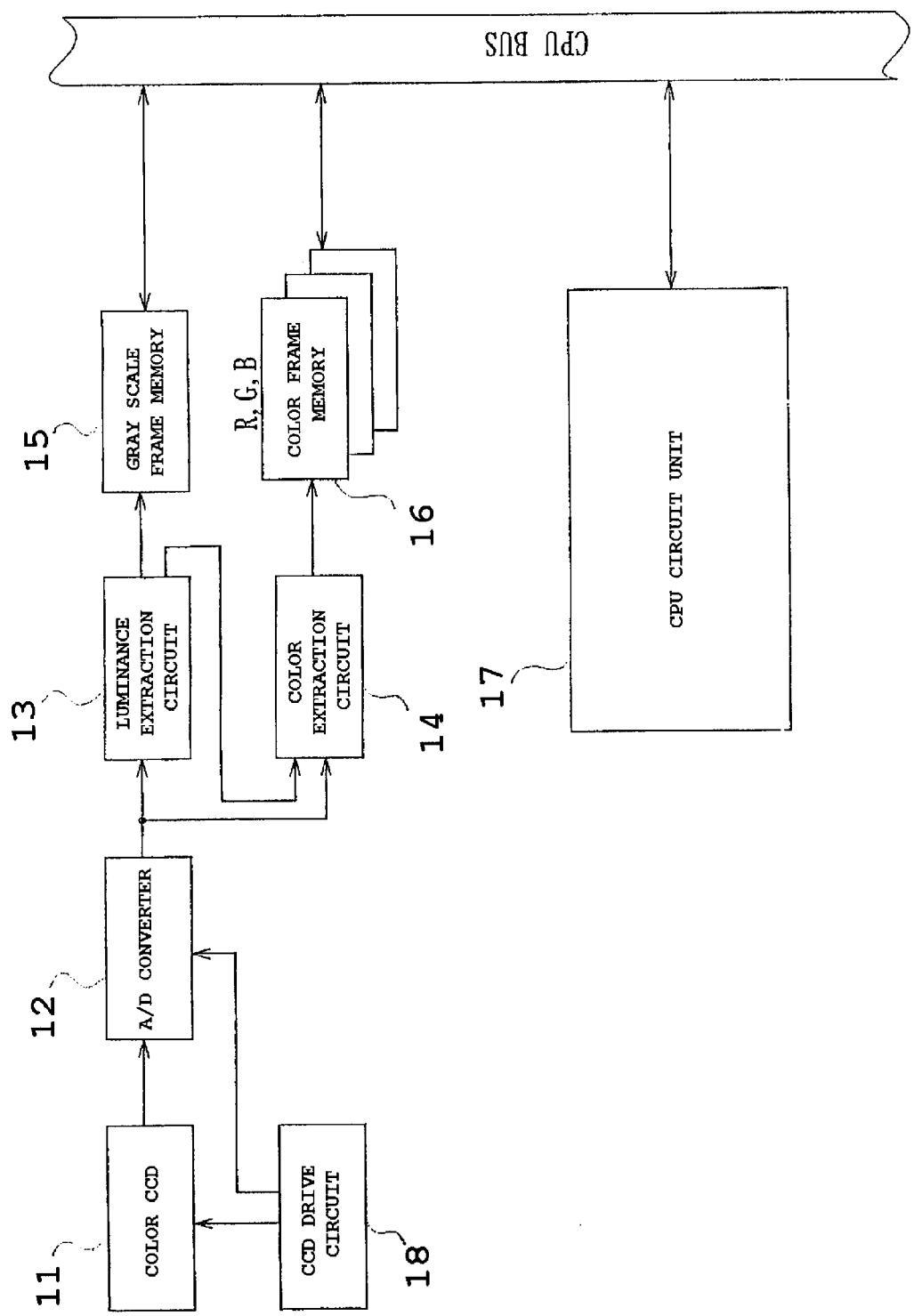
FIG. 2 is a block diagram showing an example of the hardware architecture of a code reading apparatus according to the present invention.

FIG. 2 shows an example of the hardware architecture of a code reading apparatus according to the present invention. The code reading apparatus shown in the figure includes a color imaging device as an imaging element. A two-dimensional imaging device or one-dimensional imaging device of, for example, CCD type or MOS type is applied as the color imaging device. In this example, a color two-dimensional area sensor 11 (hereinbelow, termed the "color CCD") is constructed by employing the CCD type two-dimensional imaging device.

On the output side of the color CCD 11, a luminance extraction circuit 13 and a color extraction circuit 14 are connected in parallel through an A/D (analog-to-digital) converter 12. An RGB signal from the color CCD 11 is sent to both the luminance extraction circuit 13 and the color extraction circuit 14 through the A/D converter 12 so as to be concurrently processed. The luminance extraction circuit 13 is a circuit which extracts luminance data from pixel data (RGB data) subjected to A/D conversion, and which generates gray scale data as data for recognizing a code. Here, the luminance data is evaluated by adding color components R, G and B at predetermined ratios. The gray scale data formed of the luminance data extracted by the luminance extraction circuit 13 is written into a gray scale frame memory 15, and code information is recognized and decoded on the basis of the gray scale data. Besides, the output line of the luminance extraction circuit 13 is connected to the input side of the color extraction circuit 14, so that the luminance data extracted from the pixel data is sent to the color extraction circuit 14.

The color extraction circuit 14 is a circuit which extracts color data from the RGB data subjected to the A/D conversion. The extracted color data are written into color frame memories 16 as data for the original image of a subject for management, together with the luminance data from the luminance extraction circuit 13.

A CPU circuit unit 17 includes a CPU, a RAM, a ROM and an input/output interface, and it controls the drive of the color CCD 11 through a CCD drive circuit 18. Further, the data for the code recognition and the data for the original image written into the respective frame memories 15, 16 are transmitted to an information processing apparatus under the control of the CPU circuit unit 17. The recognition (decoding) of the code based on the data for the code recognition (gray scale data) is executed on the side of the information processing apparatus or within the code reading apparatus.

Figure 3:
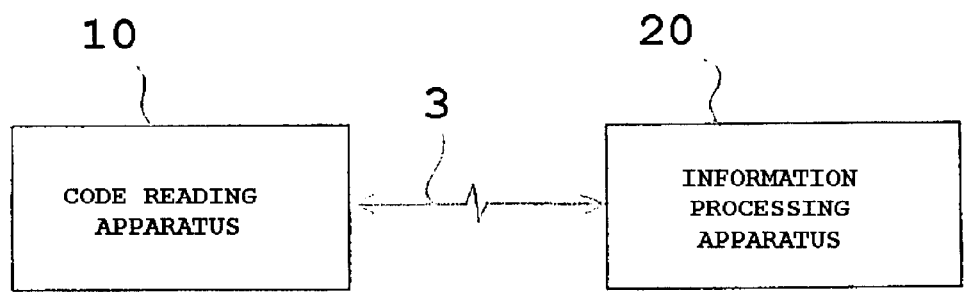
FIG. 3 is a block diagram showing the connection form between the code reading apparatus according to the present invention and an information processing apparatus.

FIG. 3 shows the connection form between the code reading apparatus 10 and the information processing apparatus 20 (a host computer, a portable type computer, or the like). The code reading apparatus 10 and the information processing apparatus 20 are connected through communication means 3 (radio communication means or a communication cable). The processing aspect of the data written into the frame memories of the code reading apparatus 10 is not restricted to an aspect in which the data are transmitted to the information processing apparatus 20 through the communication means 3 in real time. It is also allowed to employ an aspect in which data accumulation means for accumulating and recording the data in the RAM within the code reading apparatus 10 or in a transferable recording medium, such as memory card or PC card, is provided, and in which the recognized data thus accumulated can be collectively processed in batch processing fashion. It is further allowed to employ an aspect in which both the above aspects can be selected and executed. Besides, the original color image may well be handled in a processing aspect in which it is transmitted to the exterior (such as the information processing apparatus 20) or is recorded in the recording medium as mentioned above, by using the image data written into the frame memories as they are. It is also allowed to employ a processing aspect in which the written image data are compressed in conformity with an image compression technique such as JPEG (joint photographic experts group), and in which the original color image is transmitted to the exterior or is recorded in the recording medium by using the compressed data.

Besides, a code reading apparatus which is furnished with an accumulating function and a communicating function, may well be so constructed that an operator can use the apparatus by selecting one of modes (for example, a first mode for accumulating the data, a second mode for transmitting the data in real time, and a third mode for accumulating the data and also transmitting the data in real time). Further, the apparatus may well be so constructed that the data accumulated in the recording medium can be collectively or selectively accepted in compliance with a transmission request from an external computer side.

Figure 4:
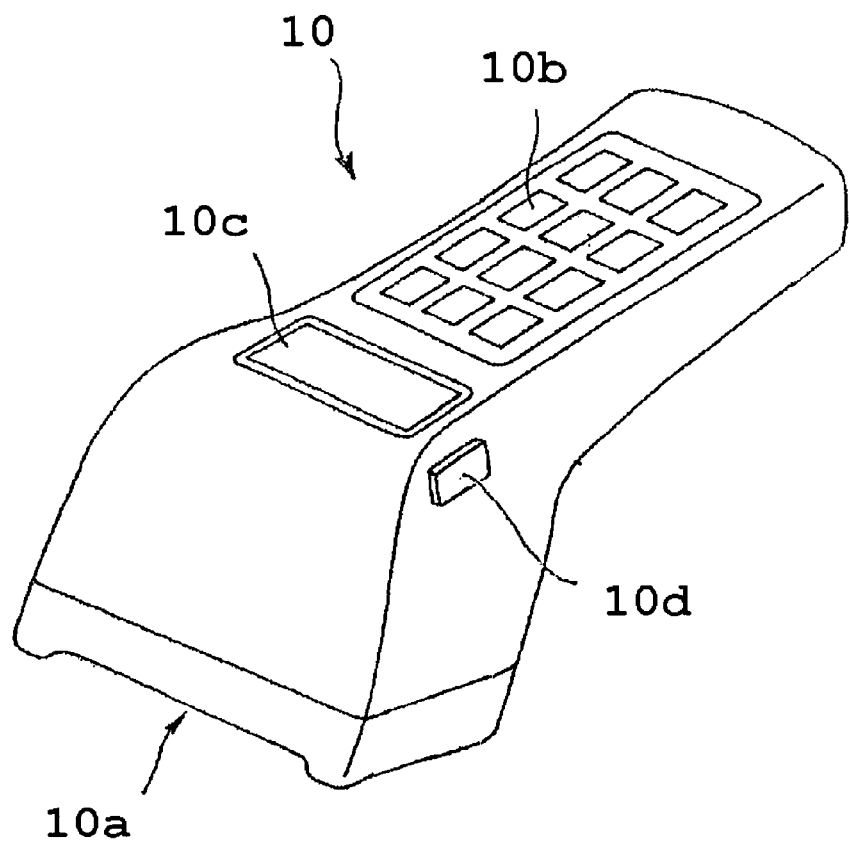
FIG. 4 is a perspective view showing an example of the exterior construction of the code reading apparatus according to the present invention.

There will be described an operating example of the code reading apparatus of the above construction according to the present invention. FIG. 4 shows the exterior construction of the code reading apparatus. The code reading apparatus in this example is of the palm-top type which an operator can operate with one hand. A read unit 10$a$ is disposed at the extreme part of one end of the apparatus 10 proper. Disposed at the upper surface part of the other end of the apparatus 10 proper are ten-key pads 10$b$ which serve to input commands for registering, erasing and displaying the data of the original image of a read subject for management and the data of the code thereof, and commands for guidance etc., and a display unit 10$c$ which is made from a liquid crystal or the like and which serves to display predetermined items.

Figure 5:
FIG. 5 is an explanatory diagram showing examples of a code and a subject for management as are applied to the present invention.

In using this code reading apparatus, the operator adjusts an imaging range while viewing a picture displayed on the display unit 10$c$ (or in accordance with guide light projected on the subject to-be-imaged and indicating the imaging region) so that a two-dimensional code 2 and a subject for management 1 to-be-imaged as shown in FIG. 5 may fall within the imaging region of the code reading apparatus. Subsequently, the operator instructs the apparatus 10 to accept an image, by depressing a trigger button 10$d$ which is disposed at the flank corner part of the apparatus 10 proper. Upon the depression of the trigger button 10$d$, light reflected from a two-dimensional area is entered into a lens system, and a focused image is picked up by the color CCD 11. Besides, the R, G and B data of each pixel in the image data subjected to the A/D conversion are sent to both the luminance extraction circuit 13 and the color extraction circuit 14.

In the luminance extraction circuit 13, the luminance data are extracted from the RGB data of individual pixel positions constituting the color image, and they are written into the gray scale frame memory 15 as the gray scale data of two-dimensional array (or one-dimensional array) and are sent to the color extraction circuit 14. Here, a luminance component is extracted from the RGB data of each pixel in the color image. The extraction of the luminance component, namely, the conversion from the RGB data into the luminance data is implemented by, for example, adding the color components R, G and B at predetermined ratios as indicated by the following formula 1:

$$Y=R+2G+B \quad \text{(Formula 1)}$$

where letters R, G and B denote the gradation values of each pixel, and letter Y denotes a luminance signal.

On the other hand, in the color extraction circuit 14, the RGB data are inputted from the A/D converter 12, color components are extracted in accordance with predetermined operation expressions, for example, r=Y−2G−B, g=(Y−R−B)/2 and b=Y−2G−R, and the extracted color data and the luminance data from the luminance extraction circuit 13 are written into the color frame memories 16 as the data for the original image of the subject for management. In the CPU circuit unit 17, the data for the original image (or the data for the original image and the data for the code recognition) are compressed, and the compressed data are stored in the RAM or the like storage means in mapping with the data for the code recognition and are transmitted to the side of the information processing apparatus 20 through the communication means 3.

Incidentally, although the code reading apparatus furnished with the two-dimensional area sensor has been exemplified in the foregoing embodiment, the two-dimensional area sensor is not restrictive, but a one-dimensional area sensor may well be employed. Besides, although the code reading apparatus of the handy type and non-touching scheme has been exemplified, the present invention shall also cover a code reading apparatus wherein a code is traced with a pen, a code reading apparatus wherein a head is brought into touch with a code, and a code reading apparatus of stationary scheme wherein a product or the like bearing a code is passed over a reading window.

As described above, according to the present invention, a color imaging device is employed as the imaging element of a code reading apparatus, the RGB signal of each of pixels constituting a color image is inputted and is concurrently processed by respective circuits for code recognition and for the color image, and gray scale data for the code recognition and data for the original color image of a subject for management are accepted from one color image. Therefore, it is permitted to easily record and manage the original color images of the subjects for management in mapping with codes, and it is possible to provide the code reading apparatus which has a comparatively inexpensive construction, which is small in size and which is capable of coping with the color images. Moreover, in separating and extracting a luminance component and color components from an RGB signal, luminance data for the code recognition is extracted by adding the pixel data of the respective color components R, G and B at predetermined ratios. Therefore, the code of one dimension or two dimensions can be recognized at a high precision from the color image.

What is claimed is:

1. In a code reader which reads a code of one dimension or two dimensions in non-touching fashion; a code reader for color images, comprising: a color image pickup means for picking up the code and also a color image of a subject for
management as is specified by-identification information contained in said code; code-recognizing-data extraction means for extracting luminance data (Y) in accordance with operation expressions, Y=R+2G+B from the color image data (R.G.B. data) picked up by said color image pickup means, and for writing gray scale data into a first frame memory as data for recognizing said code; and recorded-image extraction means for extracting color data (r.g.b. data) in accordance with
operation expressions r=Y−2G−B, g=(Y−R−B)/2 and b=Y−2G−R from said color image data picked up by said color image pickup means, and for writing the color data into a second frame memory as data for the original image of the subject for management.

2. A code reader for color images as defined in claim 1, wherein a signal processing circuit of said code-recognizing-data extraction circuit and a signal processing circuit of said recorded-image extraction circuit are connected to an output side of said color image pickup means through an A/D converter and in parallel with each other, and said color image data is concurrently processed by the signal processing circuits so as to separate and extract the luminance data and said color data.

3. A code reader for color images as defined in claim 1, comprising decode means for recognizing and decoding the information expressed by said code, from the gray scale data.

4. A code reading method for color images, characterized in that a: color imaging device is employed as an imaging element of a code reader; that a one-dimensional or two-dimensional code which contains identification information for specifying a subject for management, and color image data which contains the subject for management are inputted from the imaging device; that pixel data of R.G.B. Constituting the color image data is concurrently processed by respective signal processing circuits for luminance extraction and for color extraction, thereby to separate and extract luminance data (Y) in accordance with operation expressions, Y=R+2G+B and color data (r.g.b. data) in accordance with operation expressions, r=Y−2G−B, g+(Y−R−B)/2 and b=Y−2G−R; that the information expressed by the code is recognized on the basis of gray scale data formed of the luminance data of each pixel; and that said code and the original color image data of said subject for management can be recorded in mapping with each other.

* * * * *